US011178341B2

(12) United States Patent
Guerin et al.

(10) Patent No.: US 11,178,341 B2
(45) **Date of Patent: *Nov. 16, 2021**

(54) LOCAL TONE MAPPING

(71) Applicant: GoPro, Inc., San Mateo, CA (US)

(72) Inventors: Guillaume Matthieu Guerin, Chatillon (FR); Antoine Regimbeau, Aigremont (FR); Thomas Nicolas Emmanuel Veit, Meudon (FR); Bruno Cesar Douady-Pleven, Orsay (FR); Violaine Marie Mong-lan Sudret, Chatillon (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,132

(22) Filed: Feb. 3, 2020

(65) Prior Publication Data

US 2020/0177786 A1 Jun. 4, 2020

Related U.S. Application Data

(63) Continuation of application No. 16/368,974, filed on Mar. 29, 2019, now Pat. No. 10,554,903, which is a (Continued)

(51) Int. Cl.
*H04N 5/235* (2006.01)
*H04N 5/232* (2006.01)

(Continued)

(52) U.S. Cl.
CPC ........... *H04N 5/2355* (2013.01); *G06T 5/008* (2013.01); *H04N 5/23229* (2013.01);

(Continued)

(58) Field of Classification Search
CPC .. H04N 5/2355; H04N 5/23229; G06T 5/008; G06T 2207/20028; G06T 5/50; G06T 5/009
See application file for complete search history.

(56) References Cited

U.S. PATENT DOCUMENTS

| | | | |
|---|---|---|---|
| 4,812,903 | A | 3/1989 | Wagensonner |
| 5,012,333 | A | 4/1991 | Lee |

(Continued)

OTHER PUBLICATIONS

Durand et al., "Fast Bilateral Filtering for the Display of High-Dynamic-Range Images," Laboratory for Computer Science, Mass. Institute of Tech., pp. 257-266.

(Continued)

*Primary Examiner* — Shahbaz Nazrul
(74) *Attorney, Agent, or Firm* — Young Basile Hanlon & MacFarlane, P.C.

(57) ABSTRACT

Systems and methods are disclosed for image signal processing. For example, methods may include receiving an image from an image sensor; applying a filter to the image to obtain a low-frequency component image and a high-frequency component image; determining a first enhanced image based on a weighted sum of the low-frequency component image and the high-frequency component image, where the high-frequency component image is weighted more than the low-frequency component image; determining a second enhanced image based on the first enhanced image and a tone mapping; and storing, displaying, or transmitting an output image based on the second enhanced image.

20 Claims, 6 Drawing Sheets

Related U.S. Application Data continuation of application No. 15/690,772, filed on Aug. 30, 2017, now Pat. No. 10,284,785.

(51) Int. Cl.
*G06T 5/00* (2006.01)
*G06T 5/50* (2006.01)

(52) U.S. Cl.
CPC ................ *G06T 5/009* (2013.01); *G06T 5/50* (2013.01); *G06T 2207/20028* (2013.01)

(56) References Cited

U.S. PATENT DOCUMENTS

| | | | |
|---|---|---|---|
| 6,724,942 B1 | 4/2004 | Arai | |
| 8,525,900 B2 | 9/2013 | Garten | |
| 2005/0089239 A1 | 4/2005 | Brajovic | |
| 2009/0027558 A1 | 1/2009 | Mantiuk | |
| 2010/0053222 A1 | 3/2010 | Kerofsky | |
| 2013/0321675 A1* | 12/2013 | Cote | H04N 9/045<br>348/242 |
| 2013/0322753 A1 | 12/2013 | Lim | |
| 2014/0225940 A1 | 8/2014 | Nakagawa | |
| 2015/0078661 A1 | 3/2015 | Granados | |
| 2017/0061590 A1 | 3/2017 | Chamaret | |
| 2017/0070719 A1 | 3/2017 | Smolic | |

OTHER PUBLICATIONS

G. Eilertsen et al., "A comparative review of tone-mapping algorithms for high dynamic range video", Computer Graphics Forum, vol. 36, No. 2, May 1, 2017 (May 1, 2017), pp. 565-592, XP055442404, GB ISSN: 0167-7055, DOI: 10.1111/cgf.13148, 28 pages.

International Search Report and Written Opinion for PCT/US2018/048215, dated Dec. 19, 2018, 9 pages.

* cited by examiner

LOCAL TONE MAPPING

CROSS REFERENCE TO RELATED APPLICATION(S)

This application is a continuation of U.S. patent application Ser. No. 16/368,974, filed Mar. 29, 2019, which is a continuation of U.S. patent application Ser. No. 15/690,772, filed Aug. 30, 2018, the disclosure of which is hereby incorporated by reference in its entirety.

TECHNICAL FIELD

This disclosure relates to local tone mapping.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames from different image sensors may include spatially adjacent or overlapping content, which may be stitched together to form a larger image with a larger field of view. The image stitching process may introduce distortions that depend on the objects appearing within the field of view of the camera and/or the relative positions and orientations of those objects.

SUMMARY

Disclosed herein are implementations of local tone mapping.

In a first aspect, the subject matter described in this specification can be embodied in systems that include an image sensor configured to capture an image. The systems include a processing apparatus configured to receive the image from the image sensor; apply a filter to the image to obtain a low-frequency component image and a high-frequency component image; determine a first enhanced image based on a weighted sum of the low-frequency component image and the high-frequency component image, where the high-frequency component image is weighted more than the low-frequency component image; determine a second enhanced image based on the first enhanced image and a tone mapping; and store, display, or transmit an output image based on the second enhanced image.

In a second aspect, the subject matter described in this specification can be embodied in methods that include receiving an image from an image sensor; applying a filter to the image to obtain a low-frequency component image and a high-frequency component image; determining a first enhanced image based on a weighted sum of the low-frequency component image and the high-frequency component image, where the high-frequency component image is weighted more than the low-frequency component image; determining a second enhanced image based on the first enhanced image and a tone mapping; and storing, displaying, or transmitting an output image based on the second enhanced image.

In a third aspect, the subject matter described in this specification can be embodied in systems that include an image sensor configured to capture an image. The systems include a processing apparatus configured to receive the image from the image sensor; apply a filter to the image to obtain a low-frequency component image and a high-frequency component image; apply a non-linear mapping to the low-frequency component image to obtain gains for respective image portions; apply the gains for respective image portions to corresponding image portions of the image to obtain an enhanced image; and store, display, or transmit an output image based on the enhanced image.

In a fourth aspect, the subject matter described in this specification can be embodied in systems that include an image sensor configured to capture an image. The systems include a processing apparatus configured to receive the image from the image sensor; apply a bilateral filter to the image to obtain a low-frequency component image and a high-frequency component image; determine a first enhanced image based on a weighted sum of the low-frequency component image and the high-frequency component image, where the high-frequency component image is weighted more than the low-frequency component image; determine a second enhanced image based on the first enhanced image and a tone mapping; determine a perceptual domain image based on the second enhanced image and a gamma curve that models human perception of contrast; determine a low-frequency component perceptual domain image and a high-frequency component perceptual domain image as components of the perceptual domain image; determine a third enhanced image based on a weighted sum of the low-frequency component perceptual domain image and the high-frequency component perceptual domain image, where the high-frequency component perceptual domain image is weighted more than the low-frequency component perceptual domain image; and store, display, or transmit an output image based on the third enhanced image.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
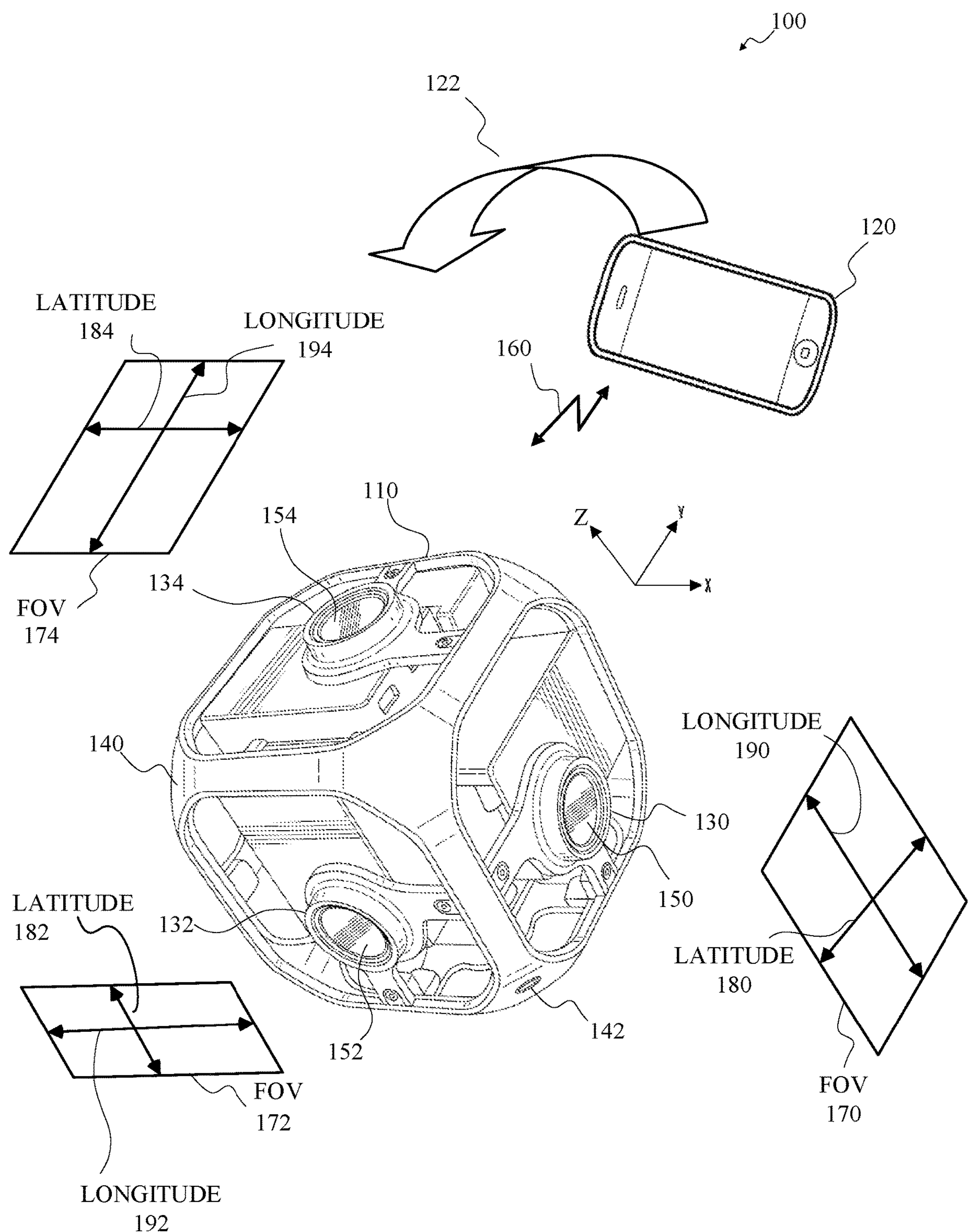
FIG. 1 is a diagram of an example of an image capture system for content capture.

This document includes disclosure of systems, apparatus, and methods for local tone mapping to enable enhancement of the quality of images generated by image capture systems. Tone mapping is a process of adjusting image luminance to improve contrast. Tone mapping may be composed of two parts: (1) a non-linear response that mimics the eye non-linear response to luminance, which is independent to the image content and may be known as a gamma curve γ( ) and (2) an image dependent contrast enhancement that may be known as a tone curve λ( ) (e.g., a tone curve that when applied to a specific image implements luminance histogram equalization).

For example, a gamma curve may transform the luminance value v according to γ(v)=v^g, with g<1, so that dark shades are lightened. When a tone curve is independent of the pixel location in the image, this may be known as global tone mapping. A problem with global tone mapping is that some parts of the image see their contrast lowered (e.g., the contrast of brighter regions of an image may be lowered).

To address the problem of reduced contrast caused by a global tone mapping, a local tone mapping may be applied that enhances contrast locally. For example, a principle of a local tone mapping may be to determine components of an input image, including a low-frequency component image (e.g., a base layer of the image or a smooth version of the image) and a high-frequency component image (e.g., details of the image, which may be a compliment of a base layer), to enable different treatment of these components for enhancement of details and/or local contrast. For example, a low-frequency component image (e.g., a base layer image) may be determined from the image using an un-sharp mask filter or a bilateral filter. In some implementations, details and/or contrast are enhanced by multiplying the high-frequency component image (e.g., the compliment of a base layer) by a constant α>1 and adding it back to the low-frequency component to obtain an enhanced image. In some implementations, local contrast is preserved by applying a global tone mapping gains selected based on the low-frequency component image both to pixels of the low-frequency component image (e.g., a base layer) and to pixels of the high-frequency component image (e.g., details).

Details and/or contrast may be enhanced in both a physical domain (e.g., before application of a gamma curve) and in a perceptual domain (e.g., after application of a gamma curve). Such a double enhancement may improve contrast and/or image quality. For example, a first enhancement may be performed before application of a gamma curve (e.g., in a physical space in which a pixel value is proportional to the photons received by the photosite) by weighting a high frequency component image more heavily than a low frequency component image. For example, a second enhancement may be performed after application of a gamma curve (e.g., in a perceptual space in which a human eye may perceive the contrast) by weighting a high frequency component perceptual domain image more heavily than a low frequency component perceptual domain image.

In some implementations, a single bilateral filter may be applied once determine the low-frequency component images (e.g., base layers) in both the physical domain and the perceptual domain. This may be accomplished by using an approximation that the gamma curve mapping commutes with the bilateral filter operation. Application of a bilateral filter uses a significant portion of the computing resources (e.g., memory and processor cycles) used for local tone mapping. Reusing the result of a single application of the bilateral filter in both domains may yield substantial saving in terms of implementation efficiency. In some implementations, the low-frequency component image (e.g., a base layer) is determined by applying a bilateral filter before application of a gamma curve and global tone mapping, then the low-frequency component perceptual domain image is determined by applying the gamma curve and global tone mapping to the low-frequency component image.

To reduced computing resource consumption, a bilateral filter may be applied at a lower resolution than the incoming image resolution. For example, the window of a bilateral filter used for determining a low-frequency component image (e.g., a base layer) may be a 300×300 pixel block. A significant cost of implementing this bilateral filter is a 300 lines buffer used to have access to this window (e.g., a pixel neighborhood) during processing. To reduce this cost, a low resolution window or neighborhood (e.g., one value for each 8×8 pixels) may be used, reducing this memory buffer size by a factor of 64. Candidate values for the bilateral filter may also be selected from this low resolution image, which means that the number of candidates is also divided by 64, which also may reduce the number of processor cycles used. This approach may facilitate implementation in an embedded solution. In some implementations, application of a bilateral filter includes processing all candidate values up to a certain maximum distance from a pixel under consideration (e.g., at the center of the window/neighborhood). In some implementations, similar results may be obtained by considering a smaller subset of these candidates (e.g., around 30% of the candidates), reducing the consumption of computing resources. For example, all candidates up to a certain first distance may be processed, then 50% of candidates between the first distance and a second distance, then 25% of candidates between the second distance and a third distance.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram of an example of an image capture system 100 for content capture. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a lateral dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, in some implementations, each of the image capture devices 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, the image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2B:
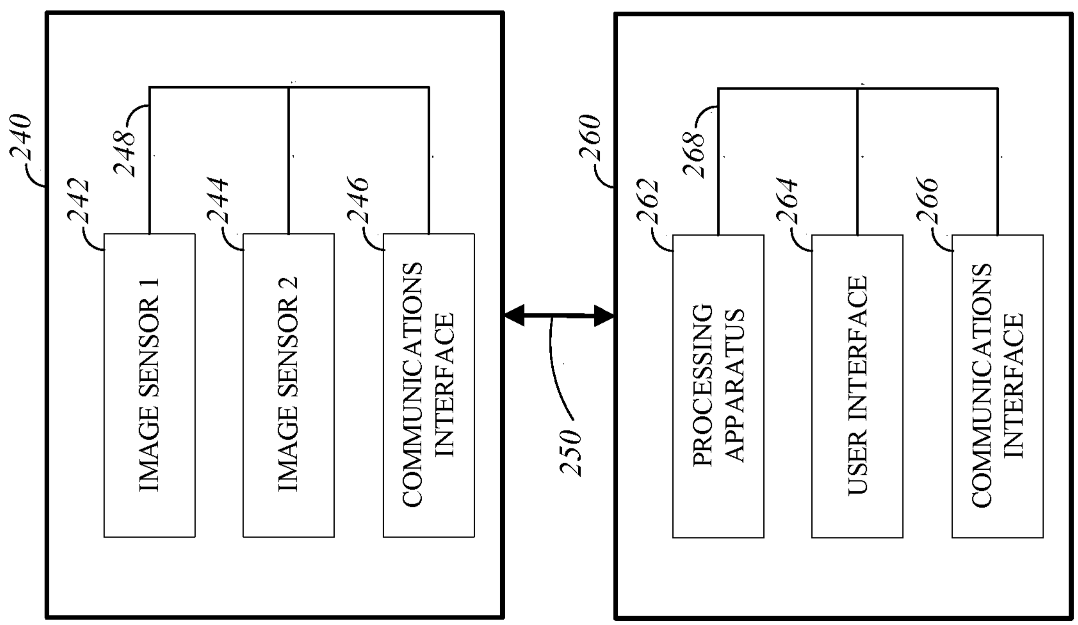
FIG. 2B is a block diagram of an example system configured for image capture and tone mapping.
Figure 2A:
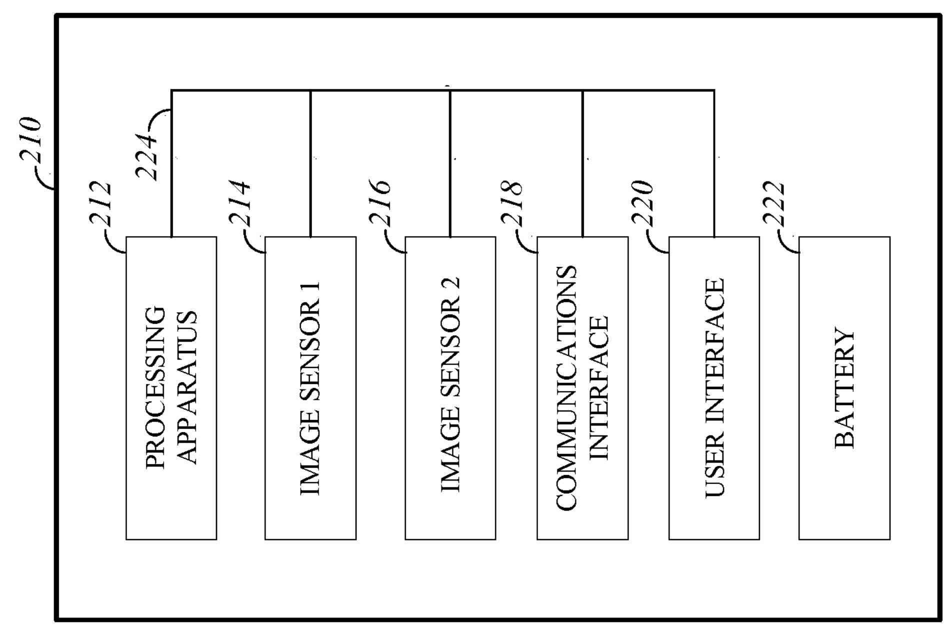
FIG. 2A is a block diagram of an example system configured for image capture and tone mapping.

FIG. 2A is a block diagram of an example of a system 200 configured for image capture and tone mapping. The system 200 includes an image capture device 210 (e.g., a camera or a drone) that includes a processing apparatus 212 that is configured to receive a first image from the first image sensor 214 and receive a second image from the second image sensor 216. The processing apparatus 212 may be configured to perform image signal processing (e.g., filtering, tone mapping, stitching, and/or encoding) to generate output images based on image data from the image sensors 214 and 216. The image capture device 210 includes a communications interface 218 for transferring images to other devices. The image capture device 210 includes a user interface 220, which may allow a user to control image capture functions and/or view images. The image capture device 210 includes a battery 222 for powering the image capture device 210. The components of the image capture device 210 may communicate with each other via the bus 224. The system 200 may be used to implement techniques described in this disclosure, such as the technique 300 of FIG. 3, the technique 400 of FIG. 4, or the technique 500 of FIG. 5.

The processing apparatus 212 may include one or more processors having single or multiple processing cores. The processing apparatus 212 may include memory, such as random access memory device (RAM), flash memory, or any other suitable type of storage device such as a non-transitory computer readable memory. The memory of the processing apparatus 212 may include executable instructions and data that can be accessed by one or more processors of the processing apparatus 212. For example, the processing apparatus 212 may include one or more DRAM modules such as double data rate synchronous dynamic random-access memory (DDR SDRAM). In some implementations, the processing apparatus 212 may include a digital signal processor (DSP). In some implementations, the processing apparatus 212 may include an application specific integrated circuit (ASIC). For example, the processing apparatus 212 may include a custom image signal processor.

The first image sensor 214 and the second image sensor 216 are configured to detect light of a certain spectrum (e.g., the visible spectrum or the infrared spectrum) and convey information constituting an image as electrical signals (e.g., analog or digital signals). For example, the image sensors 214 and 216 may include charge-coupled devices (CCD) or active pixel sensors in complementary metal-oxide-semiconductor (CMOS). The image sensors 214 and 216 may detect light incident through respective lens (e.g., a fisheye lens). In some implementations, the image sensors 214 and 216 include digital to analog converters. In some implementations, the image sensors 214 and 216 are held in a fixed orientation with respective fields of view that overlap.

The image capture device 210 may include a communications interface 218, which may enable communications with a personal computing device (e.g., a smartphone, a tablet, a laptop computer, or a desktop computer). For example, the communications interface 218 may be used to receive commands controlling image capture and processing in the image capture device 210. For example, the communications interface 218 may be used to transfer image data to a personal computing device. For example, the communications interface 218 may include a wired interface, such as a high-definition multimedia interface (HDMI), a universal serial bus (USB) interface, or a FireWire interface. For example, the communications interface 218 may include a wireless interface, such as a Bluetooth interface, a ZigBee interface, and/or a Wi-Fi interface.

The image capture device 210 may include a user interface 220. For example, the user interface 220 may include an LCD display for presenting images and/or messages to a user. For example, the user interface 220 may include a button or switch enabling a person to manually turn the image capture device 210 on and off. For example, the user interface 220 may include a shutter button for snapping pictures.

The image capture device 210 may include a battery 222 that powers the image capture device 210 and/or its peripherals. For example, the battery 222 may be charged wirelessly or through a micro-USB interface.

FIG. 2B is a block diagram of an example of a system 230 configured for image capture and tone mapping. The system 230 includes an image capture device 240 and a personal computing device 260 that communicate via a communications link 250. The image capture device 240 includes a first image sensor 242 and a second image sensor 244 that are configured to capture respective images. The image capture device 240 includes a communications interface 246 configured to transfer images via the communication link 250 to the personal computing device 260. The personal computing device 260 includes a processing apparatus 262 that is configured to receive, using the communications interface 266, a first image from the first image sensor, and receive a second image from the second image sensor 244. The processing apparatus 262 may be configured to perform image signal processing (e.g., filtering, tone mapping, stitching, and/or encoding) to generate output images based on image data from the image sensors 242 and 244. The system 230 may be used to implement techniques described in this disclosure, such as the technique 300 of FIG. 3, the technique 400 of FIG. 4, or the technique 500 of FIG. 5.

The first image sensor 242 and the second image sensor 244 are configured to detect light of a certain spectrum (e.g., the visible spectrum or the infrared spectrum) and convey information constituting an image as electrical signals (e.g., analog or digital signals). For example, the image sensors 242 and 244 may include charge-coupled devices (CCD) or active pixel sensors in complementary metal-oxide-semiconductor (CMOS). The image sensors 242 and 244 may detect light incident through respective lens (e.g., a fisheye lens). In some implementations, the image sensors 242 and 244 include digital to analog converters. In some implementations, the image sensors 242 and 244 are held in a fixed relative orientation with respective fields of view that overlap. Image signals from the image sensors 242 and 244 may be passed to other components of the image capture device 240 via the bus 248.

The communications link 250 may be a wired communications link or a wireless communications link. The communications interface 246 and the communications interface 266 may enable communications over the communications link 250. For example, the communications interface 246 and the communications interface 266 may include a high-definition multimedia interface (HDMI), a universal serial bus (USB) interface, a FireWire interface, a Bluetooth interface, a ZigBee interface, and/or a Wi-Fi interface. For example, the communications interface 246 and the communications interface 266 may be used to transfer image data from the image capture device 240 to the personal computing device 260 for image signal processing (e.g., filtering, tone mapping, stitching, and/or encoding) to generate output images based on image data from the image sensors 242 and 244.

The processing apparatus 262 may include one or more processors having single or multiple processing cores. The processing apparatus 262 may include memory, such as random access memory device (RAM), flash memory, or any other suitable type of storage device such as a non-transitory computer readable memory. The memory of the processing apparatus 262 may include executable instructions and data that can be accessed by one or more processors of the processing apparatus 262. For example, the processing apparatus 262 may include one or more DRAM modules such as double data rate synchronous dynamic random-access memory (DDR SDRAM). In some implementations, the processing apparatus 262 may include a digital signal processor (DSP). In some implementations, the processing apparatus 262 may include an application specific integrated circuit (ASIC). For example, the processing apparatus 262 may include a custom image signal processor. The processing apparatus 262 may exchange data (e.g., image data) with other components of the personal computing device 260 via the bus 268.

The personal computing device 260 may include a user interface 264. For example, the user interface 264 may include a touchscreen display for presenting images and/or messages to a user and receiving commands from a user. For example, the user interface 264 may include a button or switch enabling a person to manually turn the personal computing device 260 on and off. In some implementations, commands (e.g., start recording video, stop recording video, or snap photograph) received via the user interface 264 may be passed on to the image capture device 240 via the communications link 250.

Global tone mapping can be applied as a variable gain that is applied on the linear RGB vales according to their luminance in order to have a better repartition of the information on the output range. This gain may depend on the input histogram of luminance values and a target histogram that has to be matched (e.g., a flat histogram to equalize the image or a Gaussian histogram to have a better enhancement of shadows/highlights). Consider a pixel value $x_n=[R,G,B]^T$. A global tone mapping gain $\lambda(\ )$ may be applied as follows: $\acute{x}_n=\lambda(Y(x_n))*x_n$ where $\acute{x}_n$ is a global tone mapped pixel value and $Y(x)$ is a discrete approximation of the luminance defined by a linear combination of the R, G and B channels.

Global tone mapping can be a good approach to increase the entropy or to match a given histogram of pixel luminance but doesn't take into account the spatial repartition of the image data. Indeed, two images can have the exact same histogram but can represent either a smooth gradient or a noisy image. A goal of the global tone mapping is to widen the ranges of the input dynamic range that represent more information of the image at the expense of a compression in the range(s) of luminance values of that represent less information. This leads to a loss of contrast in some areas of the image. A resulting loss of contrast may not be that important if the compressed information is not gathered at the same location in the image, but when compressed information is spatially concentrated, it can lead to unnatural and/or low quality rendering of the image. In order to preserve or enhance some of the details that may be lost using global tone mapping only, spatial information may be introduced, which may enable keeping the contrast in these areas. A local tone mapping may help to reach this goal.

For example, a process for local tone mapping may include: separating the low and high frequencies of the input image in order to preserve the high frequency contrast and to compress low frequency transitions. Some inexpensive (in terms of computing resources) local tone mapping approaches are based on unsharp mask techniques, which may introduce halos. In order to have strong local tone mapping on high dynamic range images, halos may be suppressed by using an edge-aware filtering (e.g., a bilateral filter). High and low frequency components of an image may then be recombined to achieve preservation and/or amplification of the details.

Figure 3:
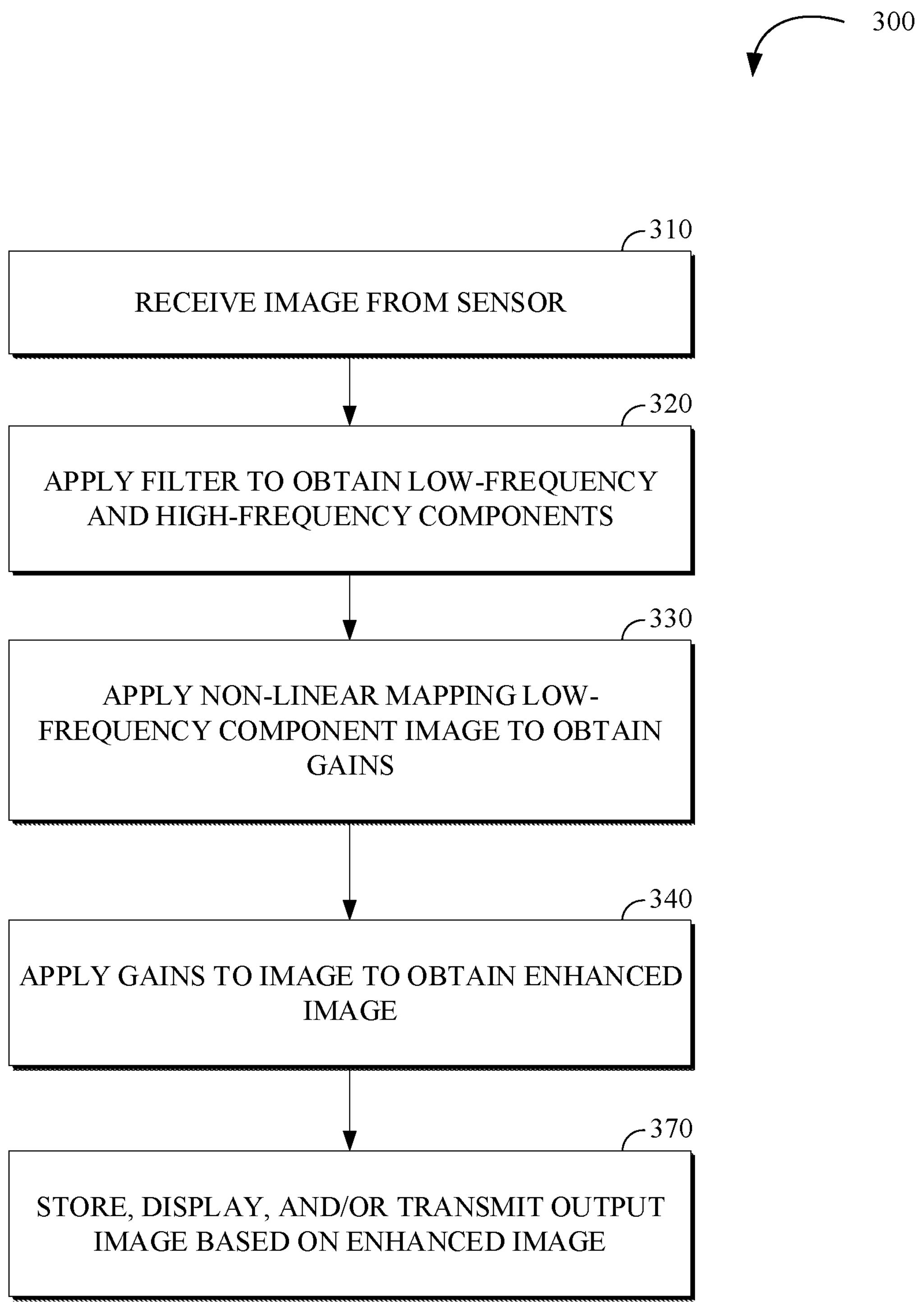
FIG. 3 is a flowchart of an example technique for local tone mapping of a captured image.

FIG. 3 is a flowchart of an example technique 300 for local tone mapping of a captured image. The technique 300 includes receiving 310 the image from an image sensor; applying 320 a filter to the image to obtain a low-frequency component image and a high-frequency component image; applying 330 a non-linear mapping to the low-frequency component image to obtain gains for respective image portions; applying 340 the gains for respective image portions to corresponding image portions of the image to obtain an enhanced image; and storing, displaying, or transmitting 370 an output image based on the enhanced image. For example, the technique 300 may be implemented by the system 200 of FIG. 2A or the system 230 of FIG. 2B. For example, the technique 300 may be implemented by an image capture device, such the image capture device 210 shown in FIG. 2, or an image capture apparatus, such as the image capture apparatus 110 shown in FIG. 1. For example, the technique 300 may be implemented by a personal computing device, such as the personal computing device 260.

The technique 300 includes receiving 310 the image from the image sensor. The image sensor may be part of an image capture apparatus (e.g., the image capture apparatus 110, the image capture device 210, or the image capture device 240). In some implementations, the image sensor may be attached to a processing apparatus that implements the technique 300. For example, the image may be received 310 from the image sensor via a bus (e.g., the bus 224). In some implementations, the image may be received 310 via a communications link (e.g., the communications link 250). For example, the image may be received 310 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 310 via communications interface 266. For example, the image may be received 310 as an input image signal, which may represent each pixel value in a defined format, such as in a RAW image format. In some implementations, the image may be frame of video, i.e., one of a sequence of images of a video. In some implementations, the image is received 310 directly from the image sensor without intermediate image processing. In some implementations, the image is received 310 after being subjected to intermediate image processing (e.g., correction of dead pixels, band processing, decoupling of vertical blanking, spatial noise reduction, and/or temporal noise reduction).

The technique 300 includes applying 320 a filter to the image to obtain a low-frequency component image and a high-frequency component image. The filter may include a low-pass filter. In some implementations, the filter may include a Guassian blur. In some implementations, the filter may include a bilateral filter. For example, a bilateral filter may be defined as follows. Consider a pixel value $x_n$ of a pixel at position $p_n$ from the image in a linear space RGB format (e.g., a luminance value $Y(x_n)$ may be determined as a linear combination of RGB channel values for the pixel). A cross-bilateral filter may be applied on x guided by $\gamma(Y(x))$ where $\gamma(\ )$ is the gamma curve that will later be applied on the image. A goal of this gamma curve is to be able to filter the contrast in a perceptual space.

$$x_n = \frac{1}{\mathrm{N\_\Omega}} \sum_{p_k\, in\Omega(p_n)} [x_k \mathrm{w\_s}(p_k, p_n)\mathrm{w\_r}(\gamma(Y(x_k)), \gamma(Y(x_n)))] \quad \text{Equation 1}$$

$$\mathrm{N\_\Omega} = \sum_{p_k\, in\Omega(p_n)} [\mathrm{w\_s}(p_k, p_n)\mathrm{w\_r}(\gamma(Y(x_k)), \gamma(Y(x_n)))]$$

where $\bar{x}$ is a low-frequency component image (e.g., a base layer); $\Omega(p_n)$ is a window of pixels around the position $p_n$; w_s( ) is a spatial Gaussian weighting function centered on $p_n$ and specified by σ_s (e.g., σ_s may be chosen to be approximately 50 for a 12 mega-pixel image and a radius of r=3*σ_s may be used for the spatial Gaussian weighting function); and w_r( ) is a similarity function based on the difference of intensity between $\gamma(Y(x_k)$ and $\gamma(Y(x_0))$ defined as:

$$w\_r(u, v) = \frac{1}{\varepsilon^{\rho}} \quad \text{if } |u - v| < \varepsilon$$

$$w\_r(u, v) = \frac{1}{|u - v|^{\rho}} \quad \text{otherwise}$$

For example, the constant p may be set to 1.5 the constant E may be set to 0.05. In some implementations, the high-frequency component image is determined as a compliment of the low-frequency component image (e.g., as $(x-\bar{x})$).

In some implementations, the computing resources (e.g., memory and/or processor cycles) consumed to apply 320 the filter may be reduced using approximations or other techniques to reduce complexity. For example, where the filter includes a bilateral filter, a reduced resolution image (e.g., a bin 8 image) may be determined based on the image that is at a lower resolution than the image, and applying the bilateral filter may include processing pixels of the reduced resolution image as candidates (i.e., pixels within the window $\Omega(p_n)$ of the bilateral filter). For example, where a bin 8 image is used for the bilateral filter rather than a full resolution image the number of candidates processed by the bilateral filter may be reduced by a factor of approximately 64. In some implementations, an anti-alias Guassian filter (e.g., σ=8 pixels) may be applied prior to subsampling to determine the reduced resolution image. Applying 320 a bilateral filter may include subsampling candidates within a range of distances from a kernel center. The subsampling of candidates may be implemented with a sparse kernel or window $\Omega(p_n)$ for the bilateral filter. For example, applying 320 a bilateral filter may include subsampling candidates at a first subsampling factor within a first range of distances from a kernel center, and subsampling candidates at a second subsampling factor within a second range of distances from the kernel center. Filter weights of a sparse bilateral filter may be modified in order to mitigate changes in the filtering strength relative to a full resolution bilateral filter (e.g., the bilateral filter of Equation 1). An interpolation may be used to interpolate the candidates according to the position of the current pixel and to have a smooth continuous output.

In order to preserve details, a goal may be to apply the same gain to all pixels belonging to the same object. Toward this end, a global tone mapping gain may be driven by the low-frequency component image: $\acute{x}_n=\lambda(\bar{x}_n)x_n$, which can be rewritten as $\acute{x}_n=\lambda(\bar{x}_n)(\bar{x}_n+(x_n-\bar{x}_n))$. From there, it can be deduced that the values of the low frequencies and high frequencies of the output image respectively are $\bar{\acute{x}}_n=\lambda(\bar{x}_n)\bar{x}_n$ and $\acute{x}_n-\bar{\acute{x}}_n=\lambda(\bar{x}_n)(x_n-\bar{x}_n)$. In this expression, we can see that the gain is driven by the low-frequency component image (e.g., a local mean of the image pixel values), but is applied both to the low frequencies $\bar{x}_n$, and to the high frequencies $(x_n-\bar{x}_n)$. Therefore the details may be enhanced the same ways as the mean. This approach may serve to preserve local contrast and preserve the details that would have been either amplified or compressed if the global tone mapping was applied without modification to account for local variation.

The technique 300 includes applying 330 a non-linear mapping to the low-frequency component image to obtain gains for respective image portions (e.g., pixels or blocks of pixels). For example, the tone curve λ( ) may be applied to the low-frequency component image to determine gains for respective image portions. In some implementations, the non-linear mapping is determined based on a histogram analysis of image portions of the of the low-frequency component image. For example, the tone curve λ( ) may be determined based on a histogram of values in the low-frequency component image $\bar{x}$. For example, the tone curve λ( ) may be determined to achieve a target histogram or distribution of luminance values for a resulting output image (e.g., to equalize the histogram of the low-frequency component image).

The technique 300 includes applying 340 the gains for respective image portions (e.g., pixels or blocks of pixels) to corresponding image portions of the image to obtain an enhanced image. The gains may be applied 340 by multiplying the gains with corresponding pixel values of the image. For example, the obtained gains $\lambda(\bar{x}_n)$ may be applied 340 according to $\acute{x}_n=\lambda(\bar{x}_n)x_n$, where $\acute{x}$ is a tone mapped enhanced image.

The technique 300 includes storing, displaying, or transmitting 370 an output image based on the enhanced image. In some implementations, the output image is the enhanced image. In some implementations, the enhanced image may by subject to additional image processing (e.g., perceptual tone mapping with a gamma curve λ( ) lens distortion correction, electronic rolling shutter correction, stitching with parallax correction and blending to combine images from multiple image sensors, electronic image stabilization, and/or output projection) to determine the output image. For example, the output image may be transmitted 370 to an external device (e.g., a personal computing device) for display or storage. For example, the output image may be stored 370 in memory of a processing apparatus (e.g., the processing apparatus 212 or the processing apparatus 262). For example, the output image may be displayed 370 in the user interface 220 or in the user interface 264. For example, the output image may be transmitted 370 via the communications interface 218.

Once the separation between the high and low frequencies in an image has been performed, it is possible to take advantage of this not only to preserve the contrast but also to perform extra contrast or detail enhancement. Tone mapping operations may be applied in different domains: (1) to an image represented in a physical domain, once we have all the information about the real color of the scene; or (2) to an image represented in a perceptual domain, after a gamma curve γ( ) has been applied to compensate for the eye contrast response non-uniformity. In the physical domain a pixel value may be proportional to the number of photons received by the sensor. Local contrast enhancement in the physical domain may lead to more natural and plausible scenes but may lack contrast in the highlights due to the compression performed by when a gamma curve is later applied. In the perceptual domain however, the same amplification may be performed on both the shadows and the highlights independently of the gamma curve compression. When well tuned, local contrast enhancement in the perceptual domain can lead to punchier images but may look more like an unnatural high dynamic range contrast enhancement when stronger. To balance these concerns, local tone mapping operations may be applied in both the physical domain and in the perceptual domain.

Figure 4:
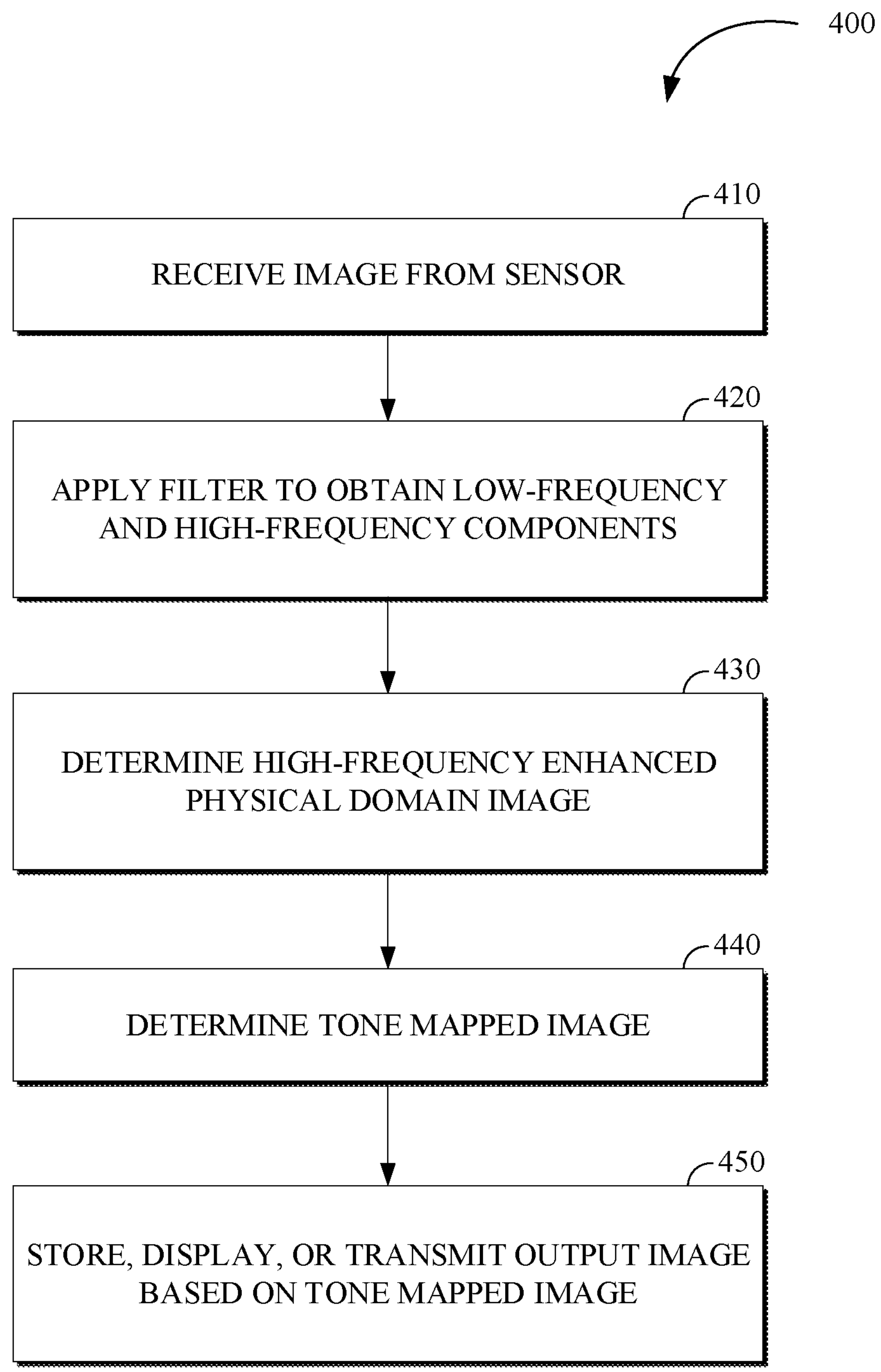
FIG. 4 is a flowchart of an example technique for local tone mapping of a captured image.

FIG. 4 is a flowchart of an example technique 400 for local tone mapping of a captured image. The technique 400 includes receiving 410 an image from an image sensor; applying 420 a filter to the image to obtain a low-frequency component image and a high-frequency component image; determining 430 a first enhanced image based on a weighted sum of the low-frequency component image and the high-frequency component image, where the high-frequency component image is weighted more than the low-frequency component image; determining 440 a second enhanced image based on the first enhanced image and a tone mapping; and storing, displaying, or transmitting 450 an output image based on the second enhanced image. For example, the technique 400 may be implemented by the system 200 of FIG. 2A or the system 230 of FIG. 2B. For example, the technique 400 may be implemented by an image capture device, such the image capture device 210 shown in FIG. 2, or an image capture apparatus, such as the image capture apparatus 110 shown in FIG. 1. For example, the technique 400 may be implemented by a personal computing device, such as the personal computing device 260.

The technique 400 includes receiving 410 an image from an image sensor. The image sensor may be part of an image capture apparatus (e.g., the image capture apparatus 110, the image capture device 210, or the image capture device 240). In some implementations, the image sensor may be attached to a processing apparatus that implements the technique 400. For example, the image may be received 410 from the image sensor via a bus (e.g., the bus 224). In some implementations, the image may be received 410 via a communications link (e.g., the communications link 250). For example, the image may be received 410 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 410 via communications interface 266. For example, the image may be received 410 as an input image signal, which may represent each pixel value in a defined format, such as in a RAW image format. In some implementations, the image may be frame of video, i.e., one of a sequence of images of a video. In some implementations, the image is received 410 directly from the image sensor without intermediate image processing. In some implementations, the image is received 410 after being subjected to intermediate image processing (e.g., correction of dead pixels, band processing, decoupling of vertical blanking, spatial noise reduction, and/or temporal noise reduction).

The technique 400 includes applying 420 a filter to the image to obtain a low-frequency component image and a high-frequency component image. The filter may include a low-pass filter. In some implementations, the filter may include a Guassian blur. In some implementations, the filter may include a bilateral filter. For example, the bilateral filter may be defined by Equation 1 above. In some implementations, the high-frequency component image is determined as a compliment of the low-frequency component image (e.g., as $(x-\bar{x})$).

The technique 400 includes determining 430 a first enhanced image based on a weighted sum of the low-frequency component image and the high-frequency component image, where the high-frequency component image is weighted more than the low-frequency component image. Local contrast enhancement may be performed by tuning the proportion of details in an enhanced image that is determined as weighted sum of component images, including the low-frequency component image and the high-frequency component image. For example, the first enhanced image may be determined according to:

$$\acute{x}_n=\bar{x}_n+\alpha(x_n-\bar{x}_n)$$

where $\acute{x}$ is the first enhanced image, x is an image represented in a physical domain, and $\alpha>1$ is a weight chosen to enhance details by weighting the high-frequency component image more heavily. In some implementations, determining 430 the first enhanced image may include checking for overflow and/or underflow conditions. For example, the first enhanced image may be determined 430 using the technique 600 of FIG. 6.

The technique 400 includes determining 440 a second enhanced image based on the first enhanced image and a tone mapping. In some implementations, a global tone mapping, based on a tone curve λ( ), may be applied to the first enhanced image to determine 440 the second enhanced image. For example, the second enhanced image $\acute{\acute{\boldsymbol{x}}}$ may be determined 440 according to:

$$\acute{\acute{\boldsymbol{x}}}_n=\lambda(\acute{x}_n)\acute{x}_n$$

In some implementations, a tone mapping that depends on pixels in a local area may be applied to the first enhanced image to determine 440 the second enhanced image. For example, determining the second enhanced image based on the first enhanced image and the tone mapping may include applying the tone mapping to the low-frequency component image to obtain gains for respective image portions; and applying the gains for respective image portions to corresponding image portions of the first enhanced image. For example, the second enhanced image $\acute{\acute{\boldsymbol{x}}}$ may be determined 440 according to:

$$\acute{\acute{\boldsymbol{x}}}_n=\lambda(\bar{x}_n)\acute{x}_n$$

For example, the tone curve λ( ) may be determined based on a histogram of values in the low-frequency component image $\bar{x}$. For example, the tone curve λ( ) may be determined to achieve a target histogram or distribution of luminance values for a resulting output image (e.g., to equalize the histogram of the low-frequency component image).

The technique 400 includes storing, displaying, or transmitting 450 an output image based on the second enhanced image. In some implementations, the output image is the second d enhanced image. In some implementations, the second enhanced image may by subject to additional image processing (e.g., perceptual tone mapping with a gamma curve γ( ) lens distortion correction, electronic rolling shutter correction, stitching with parallax correction and blending to combine images from multiple image sensors, electronic image stabilization, and/or output projection) to determine the output image. For example, the output image may be transmitted 450 to an external device (e.g., a personal computing device) for display or storage. For example, the output image may be stored 450 in memory of a processing apparatus (e.g., the processing apparatus 212 or the processing apparatus 262). For example, the output image may be displayed 450 in the user interface 220 or in the user interface 264. For example, the output image may be transmitted 450 via the communications interface 218.

Figure 5:
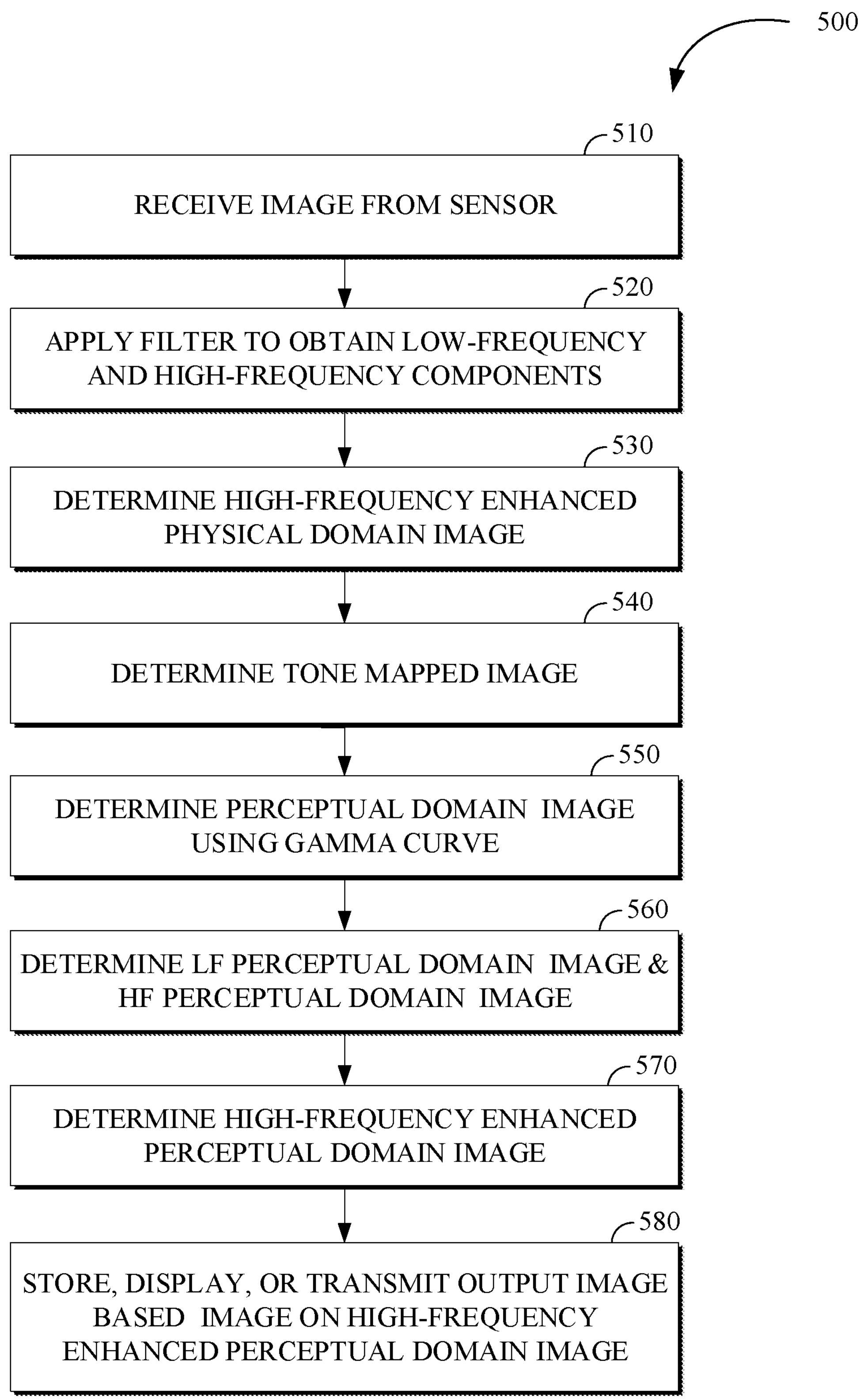
FIG. 5 is a flowchart of an example technique for local tone mapping of a captured image.

FIG. 5 is a flowchart of an example technique 500 for local tone mapping of a captured image. The technique 500 includes receiving 510 the image from the image sensor; applying 520 a filter to the image to obtain a low-frequency component image and a high-frequency component image; determining 530 a first enhanced image based on a weighted sum of the low-frequency component image and the high-frequency component image, where the high-frequency component image is weighted more than the low-frequency component image; determining 540 a second enhanced image based on the first enhanced image and a tone mapping; determining 550 a perceptual domain image based on the second enhanced image and a gamma curve that models human perception of contrast; determining 560 a low-frequency component perceptual domain image and a high-frequency component perceptual domain image as components of the perceptual domain image; determining 570 a third enhanced image based on a weighted sum of the low-frequency component perceptual domain image and the high-frequency component perceptual domain image, where the high-frequency component perceptual domain image is weighted more than the low-frequency component perceptual domain image; and storing, displaying, or transmitting 580 an output image based on the third enhanced image. For example, the technique 500 may be implemented by the system 200 of FIG. 2A or the system 230 of FIG. 2B. For example, the technique 500 may be implemented by an image capture device, such the image capture device 210 shown in FIG. 2, or an image capture apparatus, such as the image capture apparatus 110 shown in FIG. 1. For example, the technique 500 may be implemented by a personal computing device, such as the personal computing device 260.

The technique 500 includes receiving 510 an image from an image sensor. The image sensor may be part of an image capture apparatus (e.g., the image capture apparatus 110, the image capture device 210, or the image capture device 240). In some implementations, the image sensor may be attached to a processing apparatus that implements the technique 500. For example, the image may be received 510 from the image sensor via a bus (e.g., the bus 224). In some implementations, the image may be received 510 via a communications link (e.g., the communications link 250). For example, the image may be received 510 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 510 via communications interface 266. For example, the image may be received 510 as an input image signal, which may represent each pixel value in a defined format, such as in a RAW image format. In some implementations, the image may be frame of video, i.e., one of a sequence of images of a video. In some implementations, the image is received 510 directly from the image sensor without intermediate image processing. In some implementations, the image is received 510 after being subjected to intermediate image processing (e.g., correction of dead pixels, band processing, decoupling of vertical blanking, spatial noise reduction, and/or temporal noise reduction).

The technique 500 includes applying 520 a filter to the image to obtain a low-frequency component image and a high-frequency component image. The filter may include a low-pass filter. In some implementations, the filter may include a Guassian blur. In some implementations, the filter may include a bilateral filter. For example, the bilateral filter may be defined by Equation 1 above. In some implementations, the high-frequency component image is determined as a compliment of the low-frequency component image (e.g., as $(x-\bar{x})$).

In some implementations, the computing resources (e.g., memory and/or processor cycles) consumed to apply 520 the filter may be reduced using approximations or other techniques to reduce complexity. For example, where the filter includes a bilateral filter, a reduced resolution image (e.g., a bin 8 image) may be determined based on the image that is at a lower resolution than the image, and applying the bilateral filter may include processing pixels of the reduced resolution image as candidates (i.e., pixels within the window $\sigma(p_n)$ of the bilateral filter). For example, where a bin 8 image is used for the bilateral filter rather than a full resolution image the number of candidates processed by the bilateral filter may be reduced by a factor of approximately 64. In some implementations, an anti-alias Guassian filter (e.g., $\sigma=8$ pixels) may be applied prior to subsampling to determine the reduced resolution image. Applying 520 a bilateral filter may include subsampling candidates within a range of distances from a kernel center. The subsampling of candidates may be implemented with a sparse kernel or window $\Omega(p_n)$ for the bilateral filter. For example, applying 520 a bilateral filter may include subsampling candidates at a first subsampling factor within a first range of distances from a kernel center, and subsampling candidates at a second subsampling factor within a second range of distances from the kernel center. Filter weights of a sparse bilateral filter may be modified in order to mitigate changes in the filtering strength relative to a full resolution bilateral filter (e.g., the bilateral filter of Equation 1). An interpolation may be used to interpolate the candidates according to the position of the current pixel and to have a smooth continuous output.

The technique 500 includes determining 530 a first enhanced image based on a weighted sum of the low-frequency component image and the high-frequency component image, where the high-frequency component image is weighted more than the low-frequency component image. Local contrast enhancement may be performed by tuning the proportion of details in an enhanced image that is determined as weighted sum of component images, including the low-frequency component image and the high-frequency component image. For example, the first enhanced image may be determined according to:

$$\acute{x}_n=\bar{x}_n+\alpha(x_n-\bar{x}_n)$$

where $\acute{x}$ is the first enhanced image, x is an image represented in a physical domain, and $\alpha>1$ is a weight chosen to enhance details by weighting the high-frequency component image more heavily. In some implementations, determining 530 the first enhanced image may include checking for overflow and/or underflow conditions. For example, the first enhanced image may be determined 530 using the technique 600 of FIG. 6.

The technique 500 includes determining 540 a second enhanced image based on the first enhanced image and a tone mapping. In some implementations, a global tone mapping, based on a tone curve $\lambda(\ )$, may be applied to the first enhanced image to determine 540 the second enhanced image. For example, the second enhanced image $\acute{\boldsymbol{x}}$ may be determined 540 according to:

$$\acute{\boldsymbol{x}}_{\boldsymbol{n}}=\lambda(\acute{x}_n)\acute{x}_n$$

In some implementations, a tone mapping that depends on pixels in a local area may be applied to the first enhanced image to determine 540 the second enhanced image. For example, determining the second enhanced image based on the first enhanced image and the tone mapping may include applying the tone mapping to the low-frequency component image to obtain gains for respective image portions; and applying the gains for respective image portions to corresponding image portions of the first enhanced image. For example, the second enhanced image $\acute{x}$ may be determined 540 according to:

$$\acute{x}_n=\lambda(\bar{x}_n)\acute{x}_n$$

In some implementations, the tone mapping may be determined based on a histogram analysis of image portions of the of the low-frequency component image. For example, the tone curve λ( ) may be determined based on a histogram of values in the low-frequency component image $\bar{x}$. For example, the tone curve λ( ) may be determined to achieve a target histogram or distribution of luminance values for a resulting output image (e.g., to equalize the histogram of the low-frequency component image).

The technique 500 includes determining 550 a perceptual domain image based on the second enhanced image and a gamma curve that models human perception of contrast. The perceptual domain image y may be determined 550 as $y_n=\gamma(\acute{x}_n)$.

The technique 500 includes determining 560 a low-frequency component perceptual domain image and a high-frequency component perceptual domain image as components of the perceptual domain image. In some implementations, the low-frequency component perceptual domain image y may be determined 560 by applying a filter (e.g., a bilateral filter or a Guassian blur) to the perceptual domain image y. However applying a filter a second time in the perceptual domain can consume significant computing resources (e.g., memory and/or processor cycles). To conserve computing resources, in some implementations, the low-frequency component perceptual domain image is determined 560 using an approximation that it is equal to the result of applying the gamma curve to the low-frequency component image that was previously determined in the physical domain, thus avoiding a second resource intensive application of a filter (e.g., a bilateral filter). Determining 560 the low-frequency component perceptual domain image may include applying a transformation, based on the gamma curve, to a result of applying the tone mapping to the low-frequency component image. For example, the low-frequency component perceptual domain image y may be determined 560 according to: $\bar{y}_n=\gamma(\lambda(\bar{x}_n)\bar{x}_n)$. For example, the high-frequency component perceptual domain image may be determined 560 as a compliment of the low-frequency component perceptual domain image, i.e., as $(y-\bar{y})$.

The technique 500 includes determining 570 a third enhanced image based on a weighted sum of the low-frequency component perceptual domain image and the high-frequency component perceptual domain image, where the high-frequency component perceptual domain image is weighted more than the low-frequency component perceptual domain image. Local contrast enhancement may be performed by tuning the proportion of details in an enhanced perceptual domain image that is determined as weighted sum of component images, including the low-frequency component perceptual domain image and the high-frequency component perceptual domain image. For example, the third enhanced image may be determined according to:

$$\acute{y}_n=\bar{y}_n+\beta(y_n-\bar{y}_n)$$

where ý is the third enhanced image, y is the perceptual domain image, and β>1 is a weight chosen to enhance details by weighting the high-frequency component image more heavily. In some implementations, determining 570 the third enhanced image may include checking for overflow and/or underflow conditions. For example, the third enhanced image may be determined 570 using the technique 600 of FIG. 6.

It may be advantageous to apply gains associated with the third enhanced image in the physical domain, before the gamma curve application in order to avoid splitting the local tone mapping and to take advantage of a wider dynamic range. In some implementations, determining an output image based on the third enhanced image may include: determining gains for respective image portions based on the third enhanced image and the gamma curve; and applying the gains for respective image portions to corresponding image portions of the image. The representation of the third enhanced image in the physical domain is:

$$\acute{\acute{x}}_n=\gamma^{-1}(\bar{y}_n+\beta(y_n-\bar{y}_n))$$

where i$\acute{\acute{x}}$ is the third enhanced image in the physical domain, and $y^{-1}(\ )$ is the inverse transformation of the gamma curve. The detail enhancements of operations 530 and 570 may be combined. First determine gains relative to the enhancement in the physical domain as:

$$Gphys_n=\frac{Y(\acute{x}_n)}{Y(x_n)}$$

then the final tone mapping gains, which are the composition of the physical domain enhancement of operation 530 and the perceptual domain enhancement of operation 570, may be determined as:

$$Gtotal_n=\frac{Y(\acute{\acute{x}}_n)}{Y(x_n)}=\frac{Y(\gamma^{-1}(\gamma(Gphys_n\bar{x})+\beta(\gamma(Gphys_n x)-\gamma(Gphys_n\bar{x}))))}{Y(x_n)}$$

These total gains may replace a global tone mapping gain, and can be applied on input image in the physical domain (e.g., an RGB format image) to determine mapped image.

The technique 500 includes storing, displaying, or transmitting 580 an output image based on the second enhanced image. In some implementations, the output image is the second d enhanced image. In some implementations, the second enhanced image may by subject to additional image processing (e.g., perceptual tone mapping with a gamma curve γ( ) lens distortion correction, electronic rolling shutter correction, stitching with parallax correction and blending to combine images from multiple image sensors, electronic image stabilization, and/or output projection) to determine the output image. For example, the output image may be transmitted 580 to an external device (e.g., a personal computing device) for display or storage. For example, the output image may be stored 580 in memory of a processing apparatus (e.g., the processing apparatus 212 or the processing apparatus 262). For example, the output image may be displayed 580 in the user interface 220 or in the user interface 264. For example, the output image may be transmitted 580 via the communications interface 218.

The detail enhancement (e.g., as performed at operations 330, 530, and 570) incorporated into a local tone mapping might lead to some dynamic range overflow or underflow. When these dynamic range violations occur near zero, they are called underflows. When these dynamic range violations occur near the saturation level of the pixel values, they are called overflows. For example, underflows can occur when $\alpha(x_n-\bar{x}_n)<-\bar{x}_n$ for at least one of the color channels. This may result in clipping and associated distortion of the output, where pixel values are constrained to be positive.

To avoid that, the component image values may be slightly modified when an underflow condition occurs, meaning that some high-frequency component image will be transferred to the low-frequency component image while preserving the sum of low and high frequency component images. Using this approach, in extreme worst cases, all the energy of a pixel will be transferred to the low-frequency component image and the tone mapping will locally reduce to the global tone mapping of $\grave{x}_n=\lambda(x_n)x_n$, so degradation of the image compared to global tone mapping only approach may be avoided.

Modifying the results only when the resulting value is below zero could lead to some discontinuities in the image. To avoid such discontinuities, this modification may be applied and interpolated in range near zero. (Note: to simplify the equations below, assume that x is a monochromatic image). A threshold μ is specified and energy is transferred between components of the image when $\|\alpha(x_n-\bar{x}_n)\|<\mu\,\bar{x}_n$. When this occurs, the goal is to modify corresponding image portions (e.g., pixels) of the low-frequency component image pixel and the high-frequency component image according to:

$$\grave{\bar{x}}_n=\bar{x}_n+\delta_n$$

$$d\grave{x}_n=(x_n-\bar{x}_n)=x_n-\bar{x}_n-\delta_n=dx-\delta_n$$

The following equation may be solved in order to determine δ to preserve the contrast between the enhanced image (after underflow compensation) and the original image:

$$\frac{x_n-\bar{x}_n}{\bar{x}_n+(x_n-\bar{x}_n)}=\frac{\alpha((x_n-\bar{x}_n)-\delta_n)}{x_n+\delta_n+\alpha((x_n-\bar{x}_n)-\delta_n)} \quad \text{Equation 2}$$

Finally, the resulting $\delta_n$ may be interpolated and applied as follows:

$$\begin{aligned} \hat{\delta}_n &= 0, && \text{if } |\alpha(x_n-\bar{x}_n)| \le \mu_1\bar{x}_n \\ \hat{\delta}_n &= \delta_n\frac{r-\mu_1}{\mu_2-\mu_1} && \text{if } \mu_2\bar{x}_n \le |\alpha(x_n-\bar{x}_n)| > \mu_1\bar{x}_n \\ \hat{\delta}_n &= \delta_n, && \text{otherwise} \end{aligned} \quad \text{Equation 3}$$

where:

$$r=\frac{|\alpha(x_n-\bar{x}_n)|}{\bar{x}_n}$$

Figure 6:
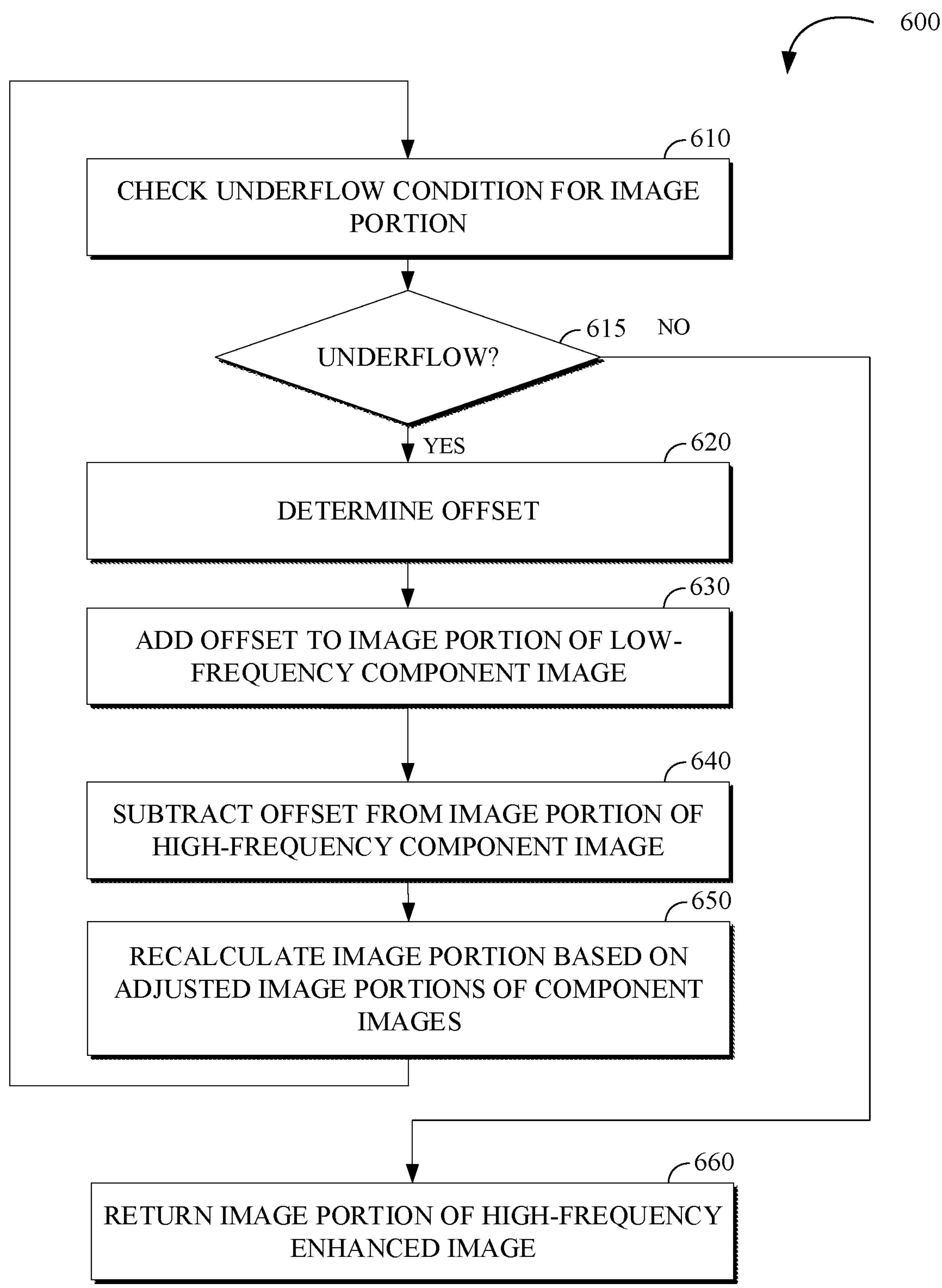
FIG. 6 is a flowchart of an example technique for high-frequency enhancement with underflow handling.

FIG. 6 is a flowchart of an example technique 600 for high-frequency enhancement with underflow handling. The technique 600 includes checking 610 an underflow condition for an image portion of an enhanced image; where the underflow condition occurs, determining 620 an offset for avoiding the underflow condition; adding 630 the offset to a corresponding image portion of the low-frequency component image; and subtracting 640 the offset from a corresponding image portion of the high-frequency component image; recalculating 650 the image portion based on the respective adjusted image portions of the low-frequency component image and the high frequency component image; and, when no underflow condition is detected for the image portion, return 660 the resulting image portion of the high-frequency enhanced image. For example, the technique 600 may be implemented by the system 200 of FIG. 2A or the system 230 of FIG. 2B. For example, the technique 600 may be implemented by an image capture device, such the image capture device 210 shown in FIG. 2, or an image capture apparatus, such as the image capture apparatus 110 shown in FIG. 1. For example, the technique 600 may be implemented by a personal computing device, such as the personal computing device 260.

The technique 600 includes checking 610 an underflow condition for an image portion (e.g., a pixel or block of pixels) of an enhanced image. In some implementations, a weighted sum used to implement contrast or detail enhancement is determined (e.g., as described in relation to operations 430, 530, or 570) and the initial result is compared to threshold. In some implementations, the threshold is zero (e.g., we only modify the enhanced image when the enhanced image would otherwise be clipped due to a dynamic range violation). In some implementations, the threshold may be set to a small positive value and image portions that include one or more values near or below zero are modified in an interpolated manner (e.g., as described further in relation to Equations 2 and 3) to mitigate discontinuities.

If (at operation 615) an underflow condition is detected, then an offset $\delta_n$ for the image portion is determined 620. In some implementations, the offset $\delta_n$ is determined 620 by iteratively increasing from an initial value. In some implementations, an interpolated offset $\delta\_final_n$ is determined 620 (e.g., as described further in relation to Equations 2 and 3).

The technique 600 includes adding 630 an offset to a corresponding image portion of the low-frequency component image, and subtracting 640 the offset from a corresponding image portion of the high-frequency component image. For example, energy may be transferred from the high-frequency component image to the low-frequency component image according to:

$$\grave{\bar{x}}_n=\bar{x}_n+\delta_n$$

$$d\grave{x}_n=(x_n-\bar{x}_n)=x_n-\bar{x}_n-\delta_n=dx_n-\delta_n$$

where dx is the initial high-frequency component image, $d\grave{x}$ is the adjusted high-frequency component image, is $\bar{x}$ the initial low-frequency component image, and $\grave{\bar{x}}$ is the adjusted low-frequency component image.

The image portion (e.g., a pixel or block of pixels) may then be recalculated 650 based on respective image portions of the adjusted low-frequency component image $\grave{\bar{x}}_n$ and the adjusted high-frequency component image $d\grave{x}_n$. For example, for physical domain enhancement, the image portion may be recalculated 650 as $\grave{x}_n=\grave{\bar{x}}_n+d\grave{x}_n$. The new value for the image portion of the enhanced image may then be checked 610 again for an underflow condition.

When (at operation 615) an underflow condition is not detected, the image portion of the enhanced image is returned.

In some implementations (not shown), the technique 300 may be modified to perform a detail enhancement on the image in a perceptual domain. This modified technique may include determining a perceptual domain image based on the enhanced image and a gamma curve γ( ) that models human perception of contrast; determining a low-frequency component perceptual domain image and a high-frequency component perceptual domain image as components of the perceptual domain image; and determining an enhanced perceptual domain image based on a weighted sum of the low-frequency component perceptual domain image and the high-frequency component perceptual domain image, where the high-frequency component perceptual domain image is weighted more than the low-frequency component perceptual domain image. When this modified technique is used, the output image that stored, displayed, or transmitted 370 is based on the enhanced perceptual domain image. In some implementations, determining the low-frequency component perceptual domain image includes applying a transformation, based on the gamma curve, to a result of applying the gains for respective image portions to the low-frequency component image. In some implementations, determining an output image based on the enhanced perceptual domain image may include: determining gains for respective image portions based on the enhanced perceptual domain image and the gamma curve; and applying the gains for respective image portions to corresponding image portions of the image.

It should be noted that the techniques described in relation to FIGS. 3-6 and similar techniques may be applied to multiple images from different image sensors of image capture apparatus (e.g., the apparatus 110 shown in FIG. 1) The resulting tone mapped images may subsequently be combined using a stitching operation. In some implementations, multiple images from different image sensors of an image capture apparatus may be combined using a stitching operation and the combined image, which includes images from each of the image sensors, may subsequently be tone mapped using the techniques described in relation to FIGS. 3-6 and similar techniques.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:

an image sensor configured to capture an image; and a processing apparatus configured to:

receive the image from the image sensor;

determine a perceptual domain image based on the image and a gamma curve that models human perception of contrast;

determine a low-frequency component perceptual domain image and a high-frequency component perceptual domain image as components of the perceptual domain image, in which the determination of the low-frequency component perceptual domain image comprises the processing apparatus being configured to apply a transformation, based on the gamma curve, to a result of application of a tone mapping to a low-frequency component of the image; and determine an enhanced image based on a weighted sum of the low-frequency component perceptual domain image and the high-frequency component perceptual domain image, where the high-frequency component perceptual domain image is weighted more than the low-frequency component perceptual domain image.

2. The system of claim 1, in which the processing apparatus is configured to determine an output image based on the enhanced image, wherein the determination of the output image comprises the processing apparatus being configured to:

determine gains for respective image portions based on the enhanced image and the gamma curve; and apply the gains for respective image portions to corresponding image portions of the image to obtain an output image.

3. The system of claim 1, in which the determination of the low-frequency component perceptual domain image comprises the processing apparatus being configured to:

apply a bilateral filter to the image to obtain the low-frequency component of the image.

4. The system of claim 3, in which the processing apparatus is configured to:

determine a reduced resolution image based on the image that is at a lower resolution than the image; and in which applying the bilateral filter comprises processing pixels of the reduced resolution image as candidates.

5. The system of claim 3, in which the application of the bilateral filter comprises the processing apparatus being configured to:

subsample candidates within a range of distances from a kernel center.

6. The system of claim 3, in which the application of the bilateral filter comprises the processing apparatus being configured to:

subsample candidates at a first subsampling factor within a first range of distances from a kernel center; and subsample candidates at a second subsampling factor within a second range of distances from the kernel center.

7. The system of claim 1, in which the image sensor is attached to the processing apparatus.

8. A method comprising:

receiving an image;

determining a perceptual domain image based on the image and a gamma curve that models human perception of contrast;

determining a low-frequency component perceptual domain image and a high-frequency component perceptual domain image as components of the perceptual domain image;

determining an enhanced image based on a weighted sum of the low-frequency component perceptual domain image and the high-frequency component perceptual domain image, where the high-frequency component perceptual domain image is weighted more than the low-frequency component perceptual domain image; and storing, displaying, or transmitting an output image based on the enhanced image, in which determining the output image comprises determining gains for respective image portions based on the enhanced image and the gamma curve and applying the gains for respective image portions to corresponding image portions of the image.

9. The method of claim 8, in which determining the low-frequency component perceptual domain image comprises applying a transformation, based on the gamma curve, to a result of applying a tone mapping to a low-frequency component of the image.

10. The method of claim 8, in which determining the low-frequency component perceptual domain image comprises:

applying a bilateral filter to the image to obtain a low-frequency component image; and applying a transformation, based on the gamma curve, to a result of applying a tone mapping to the low-frequency component of the image.

11. The method of claim 10, comprising:

determine a reduced resolution image based on the image that is at a lower resolution than the image; and in which applying the bilateral filter comprises processing pixels of the reduced resolution image as candidates.

12. The method of claim 10, in which applying the bilateral filter comprises:

subsampling candidates within a range of distances from a kernel center.

13. The method of claim 10, in which applying the bilateral filter comprises:

subsampling candidates at a first subsampling factor within a first range of distances from a kernel center; and subsampling candidates at a second subsampling factor within a second range of distances from the kernel center.

14. A method comprising:

receiving an image from an image sensor;

applying a bilateral filter to the image to obtain a low-frequency component image and a high-frequency component image, wherein applying the bilateral filter includes subsampling candidates within a range of distances from a kernel center;

determining an enhanced image based on a weighted sum of the low-frequency component image and the high-frequency component image, where the high-frequency component image is weighted more than the low-frequency component image; and storing, displaying, or transmitting an output image based on the enhanced image.

15. The method of claim 14, in which applying the bilateral filter comprises:

subsampling candidates at a first subsampling factor within a first range of distances from a kernel center; and subsampling candidates at a second subsampling factor within a second range of distances from the kernel center.

16. The method of claim 14, in which the subsampling of candidates is implemented with a sparse kernel.

17. The method of claim 14, in which applying the bilateral filter comprises:

determining a reduced resolution image based on the image that is at a lower resolution than the image; and processing pixels of the reduced resolution image as candidates.

18. The method of claim 14, comprising:

determining a perceptual domain image based on the enhanced image and a gamma curve that models human perception of contrast;

determining a low-frequency component perceptual domain image and a high-frequency component perceptual domain image as components of the perceptual domain image, in which determining the low-frequency component perceptual domain image comprises applying a transformation, based on the gamma curve, to a result of applying a tone mapping to the low-frequency component image;

determining an enhanced perceptual domain image based on a weighted sum of the low-frequency component perceptual domain image and the high-frequency component perceptual domain image, where the high-frequency component perceptual domain image is weighted more than the low-frequency component perceptual domain image; and wherein the output image is based on the enhanced perceptual domain image.

19. The method of claim 14, comprising:

determining a perceptual domain image based on the enhanced image and a gamma curve that models human perception of contrast;

determining a low-frequency component perceptual domain image and a high-frequency component perceptual domain image as components of the perceptual domain image, in which determining the low-frequency component perceptual domain image comprises applying the bilateral filter to the perceptual domain image to obtain the low-frequency component perceptual domain image;

determining an enhanced perceptual domain image based on a weighted sum of the low-frequency component perceptual domain image and the high-frequency component perceptual domain image, where the high-frequency component perceptual domain image is weighted more than the low-frequency component perceptual domain image; and wherein the output image is based on the enhanced perceptual domain image.

20. The method of claim 14, in which determining the output image comprises:

determining gains for respective image portions based on the enhanced image and the gamma curve; and applying the gains for respective image portions to corresponding image portions of the image.

* * * * *